(12) United States Patent
Strobel et al.

(10) Patent No.: US 12,110,655 B2
(45) Date of Patent: Oct. 8, 2024

(54) SHAKER ASSEMBLIES HAVING POSITIONING DEVICES

(71) Applicant: Vermeer Manufacturing Company, Pella, IA (US)

(72) Inventors: Andrew Albert Strobel, Knoxville, IA (US); Daniel John Hofland, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 17/977,615

(22) Filed: Oct. 31, 2022

(65) Prior Publication Data

US 2023/0051991 A1 Feb. 16, 2023

Related U.S. Application Data

(63) Continuation of application No. 16/389,603, filed on Apr. 19, 2019, now Pat. No. 11,525,239.

(51) Int. Cl.
*E02F 7/06* (2006.01)
*B01D 46/76* (2022.01)
(Continued)

(52) U.S. Cl.
CPC ............ *E02F 9/0808* (2013.01); *B01D 46/76* (2022.01); *E02F 3/58* (2013.01); *E02F 9/003* (2013.01); *E02F 9/085* (2013.01)

(58) Field of Classification Search
CPC .... B07B 1/42; B07B 1/28; B07B 1/00; B07B 1/46; B07B 13/16; B07B 1/30; B07B 1/4672; B07B 1/12; B07B 1/36; B07B 1/469; B07B 1/282; B07B 2201/04; B07B 1/54; B07B 9/00; B07B 1/38; B07B 4/02;
(Continued)

(56) References Cited

U.S. PATENT DOCUMENTS 3,258 A * 9/1843 Starr .......................... B07B 1/42
209/318
1,649,883 A 11/1927 Woodward
(Continued)

FOREIGN PATENT DOCUMENTS

EP 3141693 B1 3/2017
GB 2345477 B 7/2000
(Continued)

OTHER PUBLICATIONS

Thunderstorm 1 Operator's Manual, Rev. 14.3, Thunder Products, Wyo-Ben Company, 29 pages, available before Apr. 30, 2018.

*Primary Examiner* — Edwin J Toledo-Duran
(74) *Attorney, Agent, or Firm* — Armstrong Teasdale LLP

(57) ABSTRACT

Shaker assemblies for dewatering slurries are disclosed. The shaker assemblies may include a positioning device which limits movement of the vibratory frame of the shaker assembly relative to a subframe when the vibratory frame is moved from a raised operating position to a lowered position. The positioning device may guide the vibratory frame as it is lowered from the raised position to the lowered position. In some embodiments, the shaker assembly includes a locking device for locking the vibratory frame to the subframe when the vibratory frame is in the lowered position.

16 Claims, 15 Drawing Sheets

Related U.S. Application Data

(60) Provisional application No. 62/664,551, filed on Apr. 30, 2018.

(51) Int. Cl.
*E02F 3/58* (2006.01)
*E02F 9/00* (2006.01)
*E02F 9/08* (2006.01)

(58) Field of Classification Search
CPC .... B07B 4/08; B07B 1/20; B07B 1/40; B07B 1/4609; B07B 1/4654; B07B 1/16; B07B 1/4663; B07B 1/4618; B07B 13/003; B07B 9/02; B07B 1/343; B07B 1/48; B07B 1/06; B07B 1/34; B07B 1/24; B07B 1/04; B07B 1/18; B07B 1/26; B07B 1/10; B07B 13/07; B07B 13/113; B07B 15/00; B07B 2230/01; B07B 2230/04; B07B 1/08; B07B 11/04; B07B 2201/02; B07B 1/005; B01D 12/00; B01D 46/0075; B01D 2265/028; E21B 21/065; E02F 9/0808; E02F 3/58; E02F 9/003; E02F 9/085; E02F 7/06; E02F 3/8816

See application file for complete search history.

(56) References Cited

U.S. PATENT DOCUMENTS

| | | | | |
|---|---|---|---|---|
| 2,156,333 | A | 5/1939 | Cross et al. | |
| 2,225,973 | A | 12/1940 | Brown et al. | |
| 2,312,477 | A * | 3/1943 | Pollitz | B07B 1/284 74/61 |
| 2,408,964 | A * | 10/1946 | Winn | E21B 49/005 73/19.09 |
| 2,408,965 | A * | 10/1946 | Winn | E21B 49/005 436/31 |
| 2,576,283 | A | 11/1951 | Chaney | |
| 2,748,884 | A * | 6/1956 | Erwin | E21B 21/067 96/198 |
| 2,919,898 | A | 1/1960 | Marwil et al. | |
| 2,923,151 | A * | 2/1960 | Engle | E21B 49/005 73/152.19 |
| 3,016,962 | A * | 1/1962 | Lummus | E21B 21/065 210/788 |
| 3,289,775 | A | 12/1966 | Stone | |
| 3,570,670 | A * | 3/1971 | Endo | B01D 35/28 210/512.1 |
| 3,601,453 | A | 8/1971 | Silverman | |
| 3,766,997 | A | 10/1973 | Heilhecker et al. | |
| 3,773,661 | A * | 11/1973 | Talley | B01D 33/763 210/399 |
| 4,286,797 | A | 9/1981 | Mekosh, Jr. et al. | |
| 4,457,839 | A * | 7/1984 | Bailey | B01D 35/20 55/504 |
| 4,582,597 | A * | 4/1986 | Huber | B07B 1/46 209/403 |
| 4,632,751 | A | 12/1986 | Johnson et al. | |
| 4,634,535 | A | 1/1987 | Lott | |
| 4,882,054 | A | 11/1989 | Derrick et al. | |
| 5,100,539 | A * | 3/1992 | Tsutsumi | B07B 1/42 209/240 |
| 5,156,749 | A * | 10/1992 | Williams | B01D 29/843 210/791 |
| 5,190,645 | A * | 3/1993 | Burgess | B01D 33/804 209/416 |
| 5,232,098 | A * | 8/1993 | St-Pierre | B07B 1/005 209/243 |
| 5,295,317 | A | 3/1994 | Perrott | |
| 5,368,167 | A * | 11/1994 | Howes | B07B 1/46 209/396 |
| 5,531,467 | A | 7/1996 | Schueman | |
| 5,536,036 | A | 7/1996 | Ehrlich | |
| 5,641,070 | A * | 6/1997 | Seyffert | E21B 21/065 210/324 |
| 5,718,298 | A * | 2/1998 | Rusnak | E21B 21/063 166/267 |
| 6,050,116 | A | 4/2000 | Cole | |
| 6,065,606 | A * | 5/2000 | Bonner | B07B 13/16 209/325 |
| 6,213,227 | B1 | 4/2001 | Dietzen | |
| 6,279,933 | B1 | 8/2001 | Ross et al. | |
| 6,325,216 | B1 * | 12/2001 | Seyffert | E21B 21/065 209/403 |
| 6,453,584 | B1 | 9/2002 | Buckner | |
| 6,470,605 | B1 | 10/2002 | Gilman et al. | |
| 6,517,733 | B1 | 2/2003 | Carlson | |
| 6,698,593 | B1 * | 3/2004 | Folke | B07B 1/46 209/404 |
| 6,773,223 | B2 * | 8/2004 | Harris | E02F 3/3636 37/468 |
| 6,892,887 | B2 * | 5/2005 | Rayborn | B03B 5/04 209/173 |
| 6,988,568 | B2 | 1/2006 | Buckner | |
| 7,306,057 | B2 | 12/2007 | Strong et al. | |
| 7,337,860 | B2 | 3/2008 | McIntyre | |
| 7,523,570 | B2 | 4/2009 | Pobihushchy | |
| 7,690,445 | B2 | 4/2010 | Perez-Cordova | |
| 7,810,632 | B2 * | 10/2010 | Ohashi | B65G 27/34 198/720 |
| 7,841,422 | B1 * | 11/2010 | Chavez | A01B 43/00 171/111 |
| 8,172,740 | B2 | 5/2012 | El Dorry et al. | |
| 8,418,856 | B2 * | 4/2013 | Bailey | B01D 33/37 209/268 |
| 8,561,803 | B2 | 10/2013 | Fallon | |
| 8,613,360 | B2 | 12/2013 | Carr | |
| 9,033,156 | B2 * | 5/2015 | Burkhard | B07B 1/42 209/409 |
| 9,073,104 | B2 | 7/2015 | Burnett et al. | |
| 9,079,188 | B2 | 7/2015 | Culver | |
| 9,555,844 | B2 | 1/2017 | Hicks | |
| 9,662,599 | B2 | 5/2017 | Sewell et al. | |
| 9,687,878 | B2 * | 6/2017 | Galloway | B07B 1/46 |
| 10,399,017 | B2 | 9/2019 | Sewell et al. | |
| 11,111,743 | B2 * | 9/2021 | Ross | B01D 33/41 |
| 11,559,828 | B2 * | 1/2023 | Johnson | B07B 1/38 |
| 2003/0136710 | A1 * | 7/2003 | Adams | B07B 1/469 209/403 |
| 2003/0136747 | A1 | 7/2003 | Wood et al. | |
| 2003/0201237 | A1 * | 10/2003 | Grichar | B07B 1/46 210/384 |
| 2005/0242003 | A1 | 11/2005 | Scott et al. | |
| 2007/0084762 | A1 * | 4/2007 | Mainwaring | B07B 1/48 209/405 |
| 2007/0163927 | A1 | 7/2007 | Eia | |
| 2007/0227954 | A1 * | 10/2007 | Nogalski | B07B 1/46 209/404 |
| 2007/0278012 | A1 | 12/2007 | Smith | |
| 2009/0120846 | A1 | 5/2009 | Burnett | |
| 2010/0018909 | A1 * | 1/2010 | Smith | B01D 33/0376 209/269 |
| 2010/0196129 | A1 | 8/2010 | Buckner | |
| 2010/0276343 | A1 | 11/2010 | Hukki | |
| 2011/0215047 | A1 * | 9/2011 | Galloway | B07B 1/46 29/428 |
| 2013/0092637 | A1 * | 4/2013 | Pomerleau | E21B 21/065 210/324 |
| 2013/0248465 | A1 | 9/2013 | Sherwood | |
| 2015/0014508 | A1 * | 1/2015 | Sherwood | F16M 1/00 248/558 |
| 2016/0177644 | A1 | 6/2016 | Tooley et al. | |
| 2017/0254163 | A1 * | 9/2017 | Ross | B01D 33/76 |
| 2017/0320095 | A1 * | 11/2017 | Lunnemann | B07B 1/4618 |
| 2018/0202906 | A1 * | 7/2018 | Loan | E21B 49/02 |

(56) References Cited

U.S. PATENT DOCUMENTS

2019/0017243 A1   1/2019   Strobel et al.
2019/0048666 A1*  2/2019   Orban .................... E21B 15/00

FOREIGN PATENT DOCUMENTS

WO    2008082424 A1    7/2008
WO    2015187898 A1   12/2015

* cited by examiner

SHAKER ASSEMBLIES HAVING POSITIONING DEVICES

CROSS-REFERENCE TO RELATED APPLICATIONS

This application is a continuation of U.S. Non-provisional patent application Ser. No. 16/389,603, filed Apr. 19, 2019, which claims the benefit of U.S. Provisional Patent Application No. 62/664,551, filed Apr. 30, 2018. Both applications are incorporated herein by reference in their entirety.

FIELD OF THE DISCLOSURE

The field of the disclosure relates to shaker assemblies for dewatering slurries and, in particular, to shaker assemblies having positioning devices.

BACKGROUND

Shaker assemblies may be used to separate material and/or to dewater slurry from an excavation site as part of a hydro excavation vacuum system. During transport of the hydro excavation vacuum system, it is preferred that the shaker assembly is secured, or locked, to prevent damage to the shaker assembly and/or to prevent instability and weight shifting issues during transit. A vacuum truck including a hydro excavation vacuum system may be highly mobile and may move between multiple work sites during a day. In hydro excavation vacuum systems that involve onboard dewatering of the excavation slurry, substantial time would be involved to lock and unlock a shaker assembly before and after the vacuum truck is moved between sites. Further, the operator may forget to lock the shaker assembly before transport, causing damage to the shaker assembly or other processing units on the vacuum truck. Similarly, drilling fluid reclaimer systems may also be mobile and moved between drilling sites.

A need exists for shaker assemblies that may be secured with greater ease and/or that automatically locks to increase the efficiency and safety of hydro excavation vacuum systems and/or drilling fluid reclaimer systems.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a shaker assembly for dewatering material. The shaker assembly includes a vibratory frame and a subframe that supports the vibratory frame. The shaker assembly includes at least one isolation device for isolating vibration of the vibratory frame from the subframe. The isolation device is connected to the vibratory frame and the subframe. The isolation device moves the vibratory frame between a raised position in which the vibratory screen operates to dewater material and a lowered position in which the vibratory frame rests on the subframe. The shaker assembly includes a positioning device for guiding the vibratory frame as it is lowered from the raised position to the lowered position. The positioning device has a subframe guiding element connected to the subframe and a vibratory frame guiding element connected to the vibratory frame. The positioning device constrains movement of the vibratory frame relative to the subframe when the vibratory frame is in the lowered position.

Another aspect of the present disclosure is directed to a shaker assembly for dewatering material. The shaker assembly includes a vibratory frame that supports a vibratory screen having openings for dewatering material that contacts the screen. The shaker assembly includes a subframe that supports the vibratory frame. The shaker assembly includes at least one isolation device for damping vibration transferred from the vibratory frame to the subframe. The damping device is connected to the vibratory frame and the subframe. The shaker assembly includes an actuator moveable between a locked position in which the vibratory frame is secured to the subframe and an unlocked position in which the vibratory frame is capable of moving relative to the subframe.

Yet a further aspect of the present disclosure is directed to a hydro excavation vacuum apparatus for excavating earthen material. The hydro excavation vacuum apparatus includes a wand for directing pressurized water toward earthen material to cut the earthen material at an excavation site. The hydro excavation vacuum apparatus includes a vacuum system for removing cut earthen material and water from the excavation site in an airstream. The hydro excavation vacuum apparatus includes a shaker assembly for dewatering material removed from the excavation site. The shaker assembly includes a subframe and a vibratory frame. The vibratory frame is movable relative to the subframe between a raised position and a lowered position. The shaker assembly includes a positioning device for guiding the vibratory frame as it is lowered from the raised position to the lowered position. The positioning device has a subframe guiding element connected to the subframe and a vibratory frame guiding element connected to the vibratory frame. The positioning device limits movement of the vibratory frame relative to the subframe when the vibratory frame is in the lowered position.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
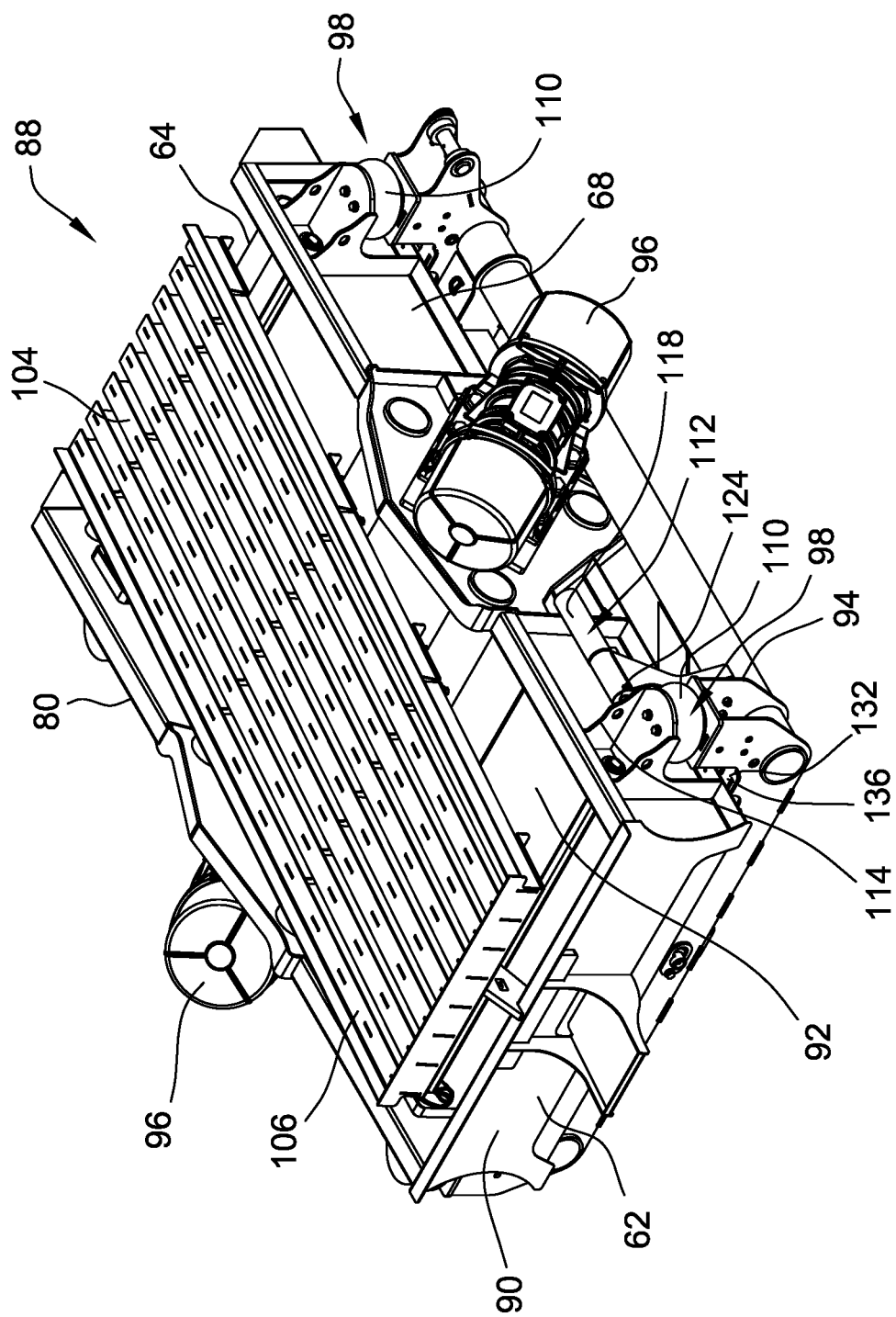
FIG. 1 is a perspective view of a shaker assembly in a raised position.
Figure 2:
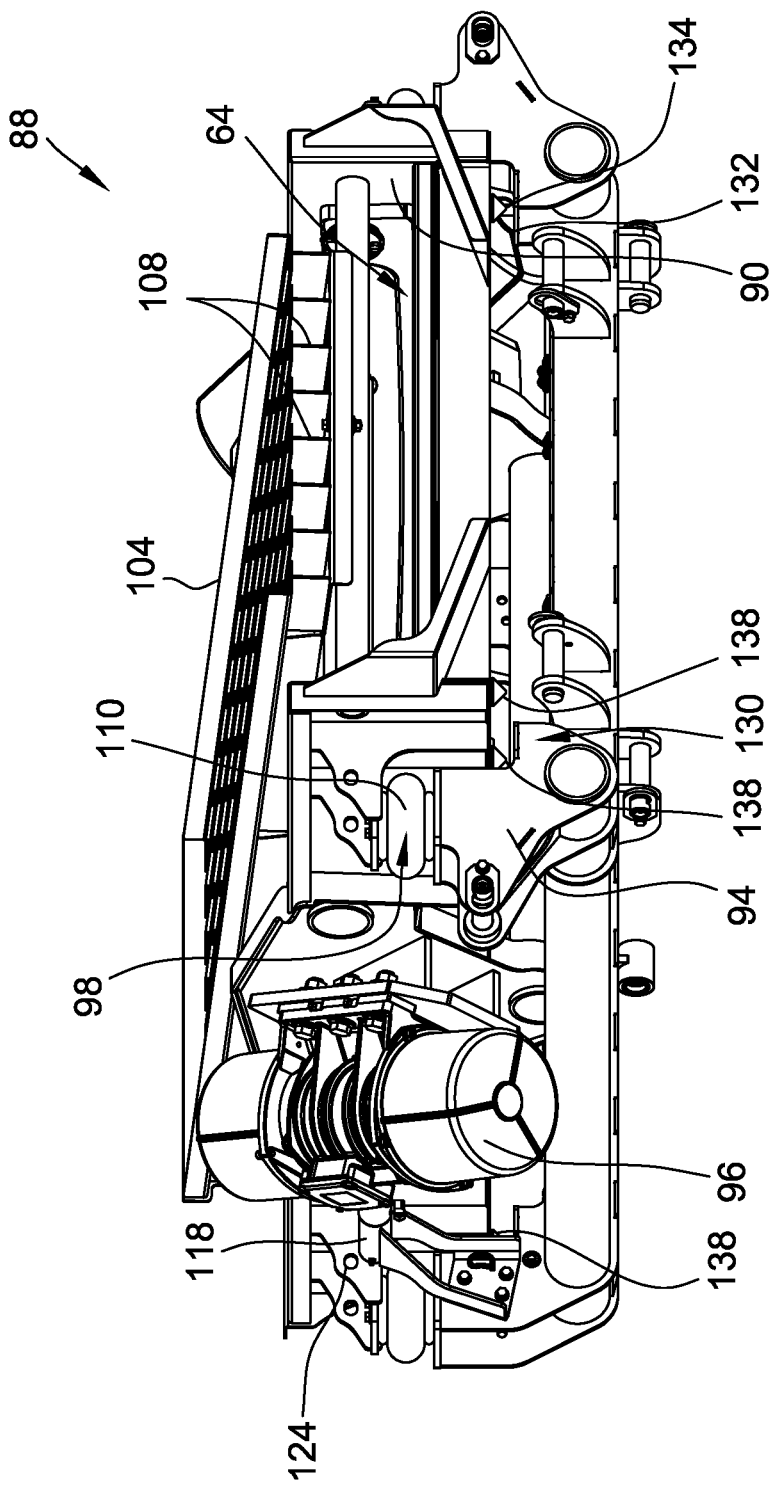
FIG. 2 is a perspective view of the shaker assembly in the raised position.
Figure 3:
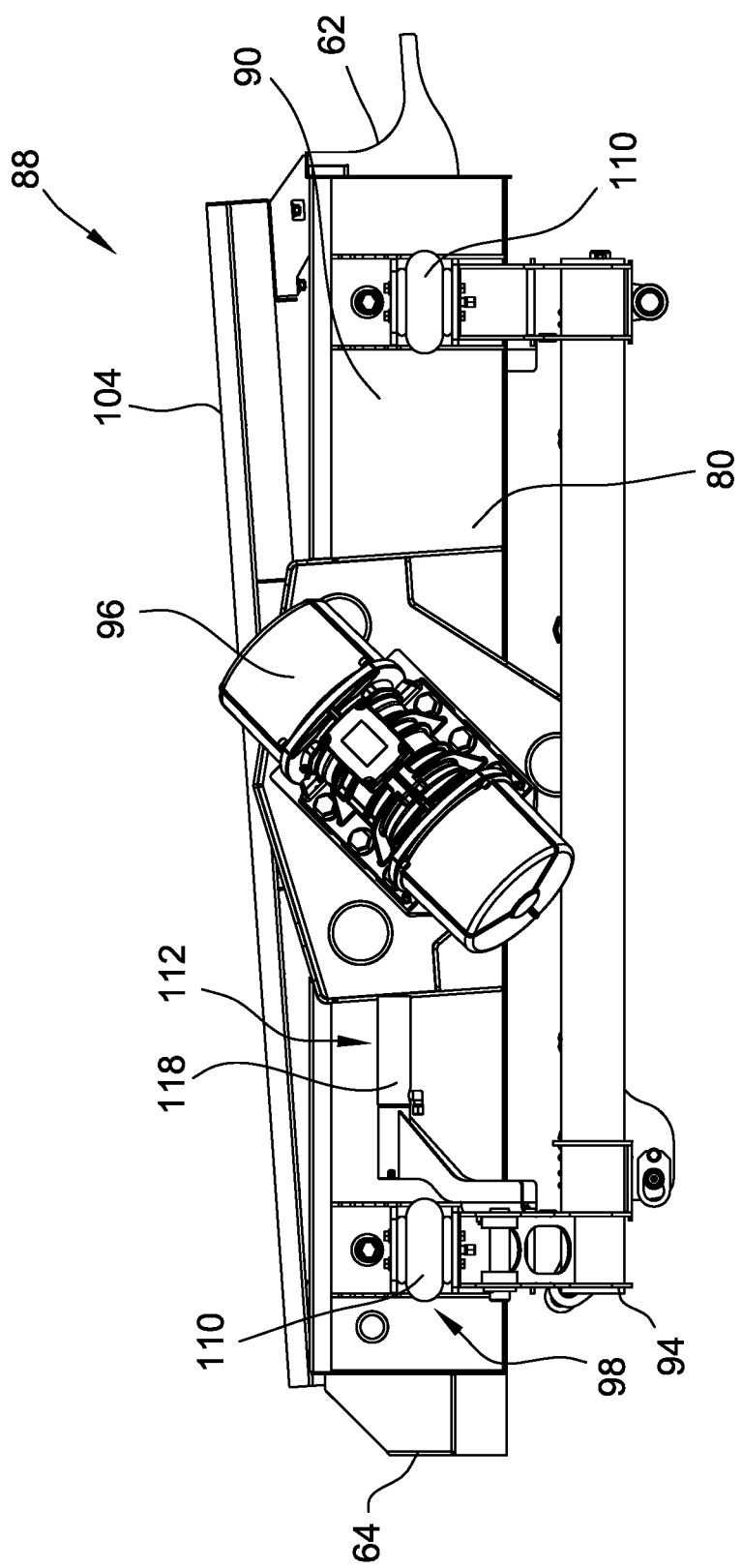
FIG. 3 is a side view of the shaker assembly in the raised position.
Figure 4:
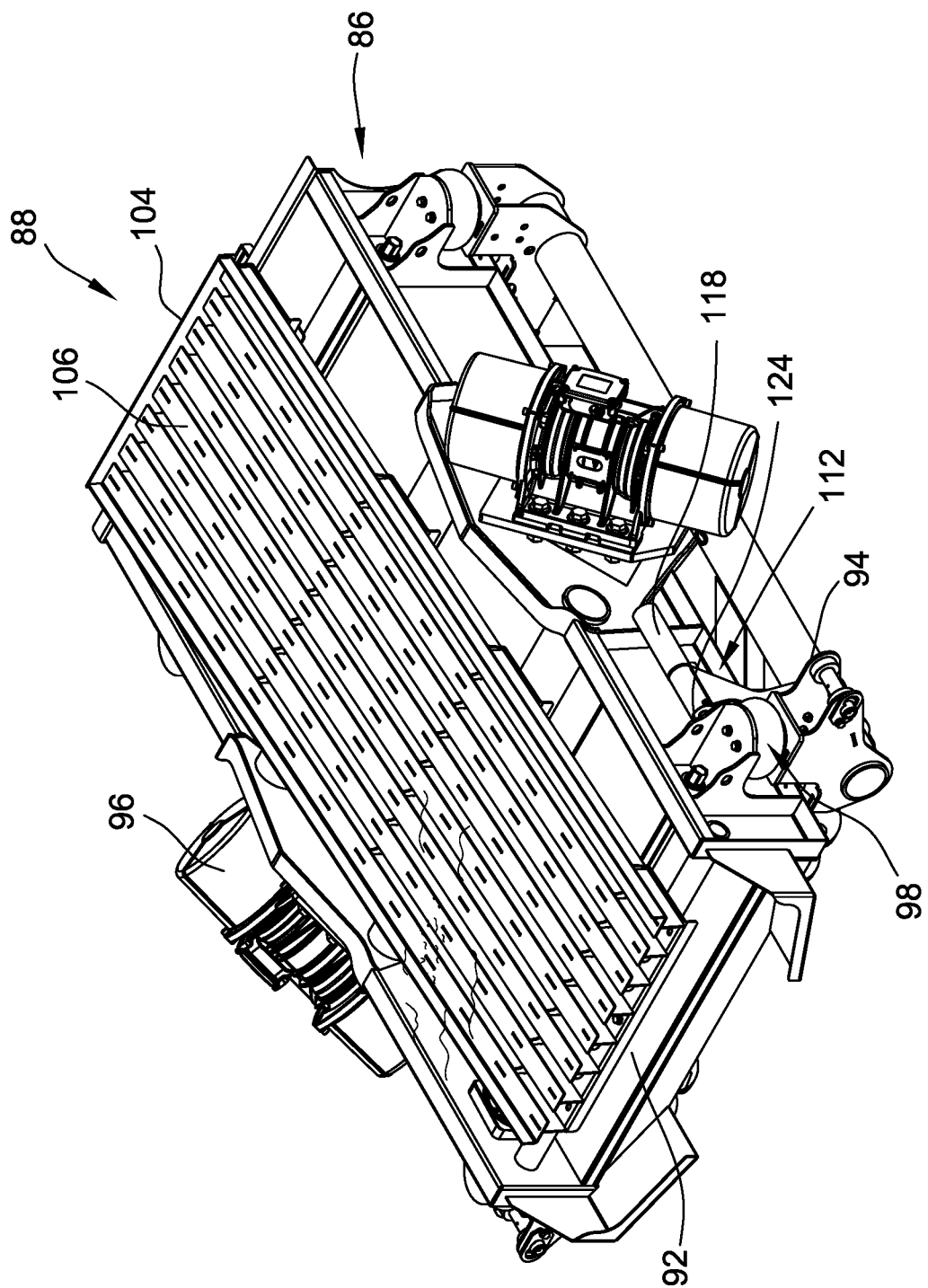
FIG. 4 is a perspective view of the shaker assembly in the raised position.

An example shaker assembly 88 (which may also be referred to as a "shaker") for dewatering an excavation slurry is shown in FIGS. 1-3. The shaker assembly 88 may generally be any apparatus in which material is dewatered and/or material is separated by size by action of a vibrating screen. Such shaker assemblies may be used in a hydro excavation vacuum apparatus such as the apparatus 12 of FIGS. 9-13 or in a drilling fluid reclaimer system such as the system of FIG. 15.

The shaker assembly 88 includes a vibratory frame 90 that supports a vibratory screen 92. A subframe 94 supports the vibratory frame 90 and is connected to the vibratory frame 90 by one or more isolation devices 98. The term "subframe" as used herein generally refers to any structure which supports the vibratory frame 90. In the illustrated embodiment, the subframe 94 pivots to level the shaker assembly 88. The subframe 94 is supported by a mainframe 102 (FIG. 13) such as the mainframe of a vehicle which carries the shaker assembly 88. In some embodiments, the subframe 94 is part of the mainframe itself (e.g., such as when the leveling frame is eliminated).

Vibratory motors 96 are connected to the vibratory frame 90 and are configured to move the vibratory screen 92 linearly or in an elliptical path (e.g., by arranging the number of motors, orientation of the motors, and/or placement of the motors to move the vibratory screen 92 linearly or in an elliptical path). In other embodiments, the shaker assembly 88 includes a single vibratory motor 96 or more than two vibratory motors 96.

The isolation device 98 is connected to the vibratory frame 90 and to the subframe 94 for isolating the vibration transferred from the vibratory frame 90 to the subframe 94. The term "isolation" as used herein should be understood to not imply full dampening of the vibration transferred to the subframe 94. In the illustrated embodiment, the isolation device 98 includes four inflatable airbags 110 positioned near each corner of the vibratory frame 90 and corresponding corner of the subframe 94. In other embodiments, the isolation device 98 is one or more rubber isolators, coil springs, cable springs, and/or a lever arm with rubber isolation and torsion control. The isolation device 98 moves the vibratory frame 90 between a raised position (e.g., when the airbags 110 are inflated as in FIGS. 1-4) and a lowered position when the vibratory frame 90 rests on the subframe 94 (e.g., when the airbags are deflated as in FIG. 5). The vibratory frame 90 is capable of moving relative to the subframe 94 when the vibratory frame 90 is in the raised position (i.e., capable of vibrating independent from the subframe 94). As further described below, the vibratory frame 90 may be secured to the subframe 94 when the vibratory frame 90 is in the lowered position.

Figure 5:
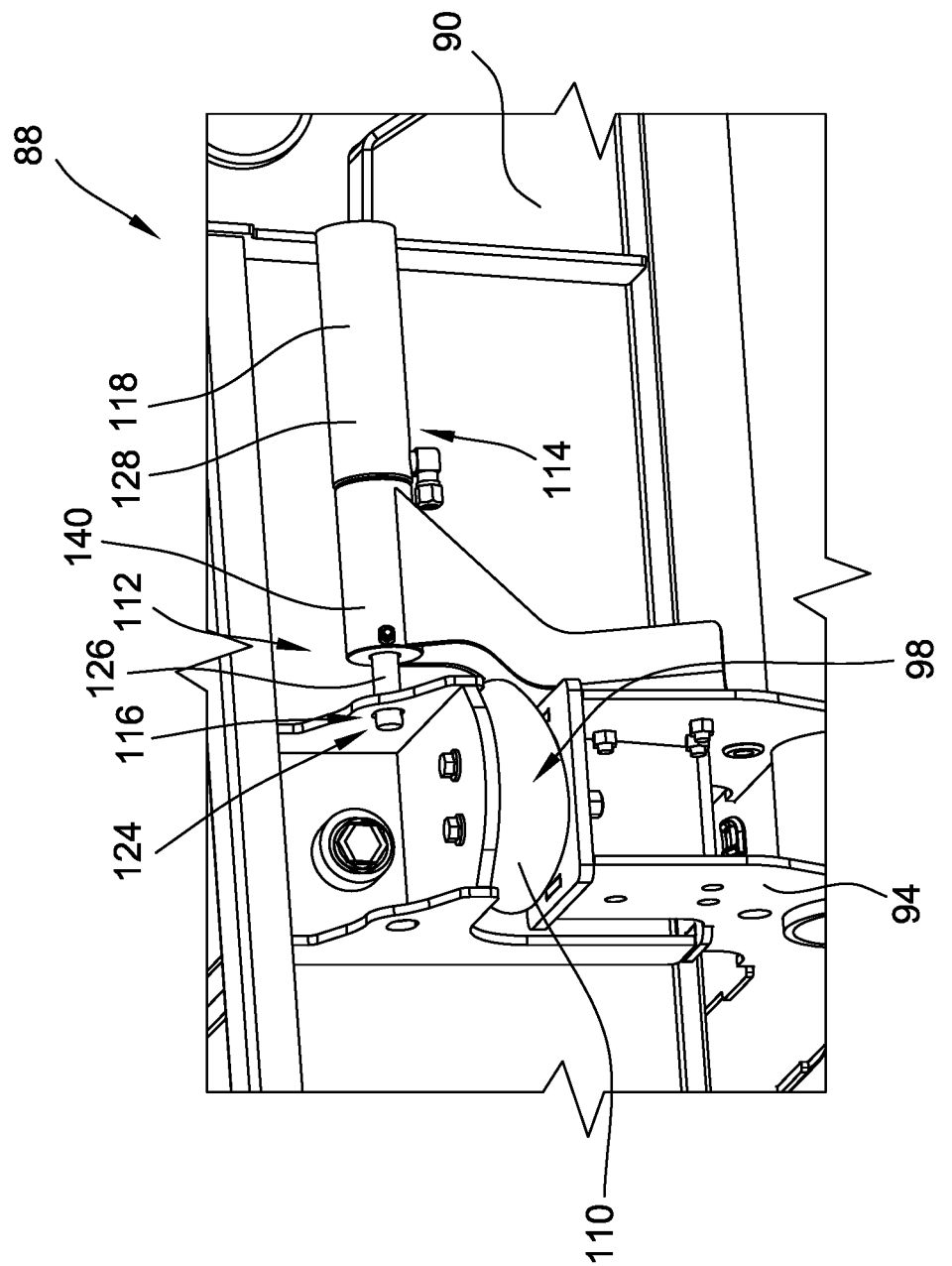
FIG. 5 is a perspective view of a locking device in a locked position with the shaker assembly being in a lowered position.

In some embodiments of the present disclosure and as shown in FIG. 5, the vibratory frame 90 may be secured to the subframe 94 by a locking device 112 when the vibratory frame 90 is in the lowered position. The locking device 112 includes a subframe locking element 114 connected to the subframe 94 and a vibratory frame locking element 116 connected to the vibratory frame 90. In the illustrated embodiment, the subframe locking element 114 is an actuator 118 moveable between a locked position (FIG. 5), in which the vibratory frame 90 is secured to the subframe 94, and an unlocked position (FIGS. 1-4) in which the vibratory frame 90 is capable of moving relative to the subframe 94 (e.g., during operation of the shaker assembly 88). The vibratory frame locking element 116 defines a locking pin opening 124 for releasably receiving a locking pin 126 (FIG. 5). When the vibratory frame 90 is lowered upon deactivation of the isolation device 98, the locking pin opening 124 is aligned with the locking pin 126. In an alternative embodiment, the vibratory frame locking element 116 is the extendable locking pin 126 and the subframe locking element 114 defines the locking pin opening 124. In some embodiments, the locking pin 126 or locking pin opening 124 may be tapered to promote engagement of the locking pin 126 with the opening 124.

In the illustrated embodiment, the actuator 118 is a powered cylinder and includes the extendable locking pin 126 for securing the vibratory frame 90 to the subframe 94 in the secured, lowered position. The actuator 118 is supported by an actuator mount 140. The actuator 118 may be configured to retract the locking pin 126 into a barrel 128 when the actuator is powered and to extend the locking pin 126 from the barrel 128 when the actuator 118 is not powered. For example, the actuator 118 may include a biasing element (not shown) such as a spring that biases the pin 126 toward the locking position (FIG. 5). Upon powering of the actuator 118, the actuator 118 overcomes the force of the biasing element and causes the pin 126 to retract into the barrel 128. The extendable locking pin 126 is retracted in the unlocked position when the vibratory frame 90 is in the raised position. Once the vibratory frame 90 is lowered, the locking pin extends to the locked position. To raise the vibratory frame 90, the locking pin 126 is moved to the unlocked position and the vibratory frame is then raised to its operating position.

Figure 8:
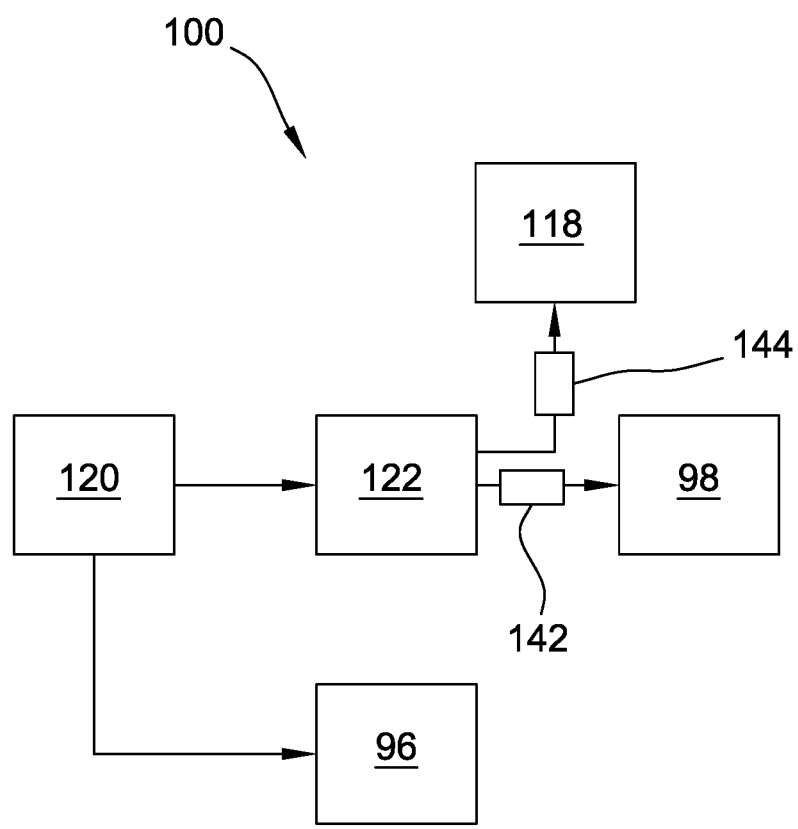
FIG. 8 is a schematic of a control system for powering the shaker assembly.

In the illustrated embodiment, the actuator 118 is in communication (e.g., fluid communication) with the airbags 110. The locking pin 126 extends when the airbags 110 are deflated and the locking pin retracts prior to the airbags 110 being inflated. Referring now to FIG. 8 in which a control system 100 for powering the shaker assembly 88 is shown, the actuator 118 and isolation device 98 may be connected to a power source 122 (e.g., pneumatic or hydraulic pump). Upon activation of the power source 122, the actuator 118 is powered to move the actuator 118 to the unlocked position and the isolation device 98 is activated to raise the vibratory frame 90 to the raised operating position. An actuation time delay 142 may be built into the system 100 to allow the isolation device 98 to be activated only after the actuator 118 is moved to the unlocked position. Upon de-activation of the power source 122, the actuator 118 is unpowered which causes the actuator to move to the unlocked position (e.g., such as by spring action) and the isolation device 98 is de-activated to cause the vibratory frame 90 to be moved to the lowered position. A de-activation time-delay 144 may be built into the system 100 such that the actuator moves to the locked position only after the vibratory frame is moved to the lowered position.

The vibratory motors 96 may be connected to the power source 122 or may be separately powered as shown in FIG. 8 (e.g., the power source 122 is pneumatic while the vibratory motor 96 is hydraulically powered). The motors 96 and the power source 122 that powers the isolation devices 98 and actuator 118 may be controlled from a user interface 120 (e.g., touchscreen, push buttons, levers or the like) which controls operation of the shaker assembly 88.

In some embodiments, the control system 100 is configured such that the vibratory motors 96 cannot be powered when the vibratory frame is in the lowered, locked position. Alternatively or in addition, the control system 100 may be configured to prevent the isolation devices 98 from being activated when the vibratory frame is locked.

Figure 13:
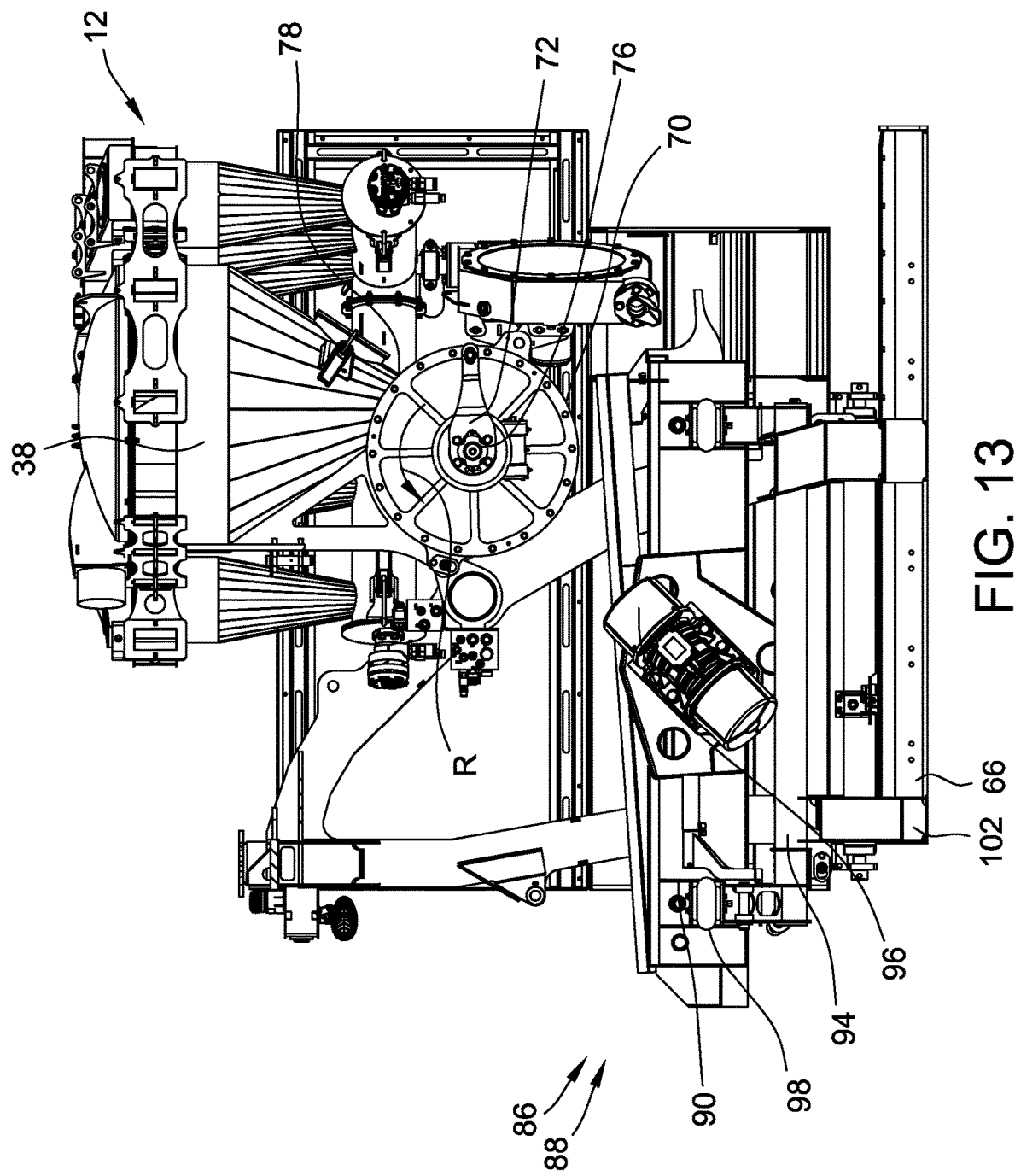
FIG. 13 is side view of the hydro excavation vacuum apparatus illustrating a shaker assembly and separation vessel.

The shaker assembly 88 includes a loading end 62 (FIG. 1) toward which material is loaded on the screen 92 and a solids discharge end 64 at which solid materials carried by the screen 92 are discharged. Material that passes through the screen 92 is collected in a catchpan 66 (FIG. 13). The shaker assembly 88 defines a first side 68 and a second side 80 opposite the first side 68 that extends between the loading end 62 and solids discharge end 64. In the illustrated embodiment, the shaker assembly 88 includes a first locking device 112 (FIG. 1) positioned toward the first side 68 and toward the loading end 62 and a second locking device 112 (FIG. 3) positioned toward the second side 80 and toward the solids discharge end 64. In other embodiments, the shaker assembly 88 includes a single locking device 112 or more than two locking devices and/or the locking devices 112 may be disposed at other positions on the shaker assembly 88. For example, the shaker assembly 88 may include (1) a locking device 112 toward each corner of the shaker assembly 88, (2) two locking devices 112 toward the loading end 62 or toward the solids discharge end 64, (3) three locking devices 112 at suitable positions, (4) a locking device 112 positioned toward the second side 80 and toward the loading end 62 and a locking device 112 positioned toward the first side 68 and toward the solids discharge end 64, or (5) two locking devices with a locking device on each side 68, 80 and positioned between the loading end 62 and solids discharge end 64 (i.e., near the center and spaced from isolation devices 98).

Figure 6:
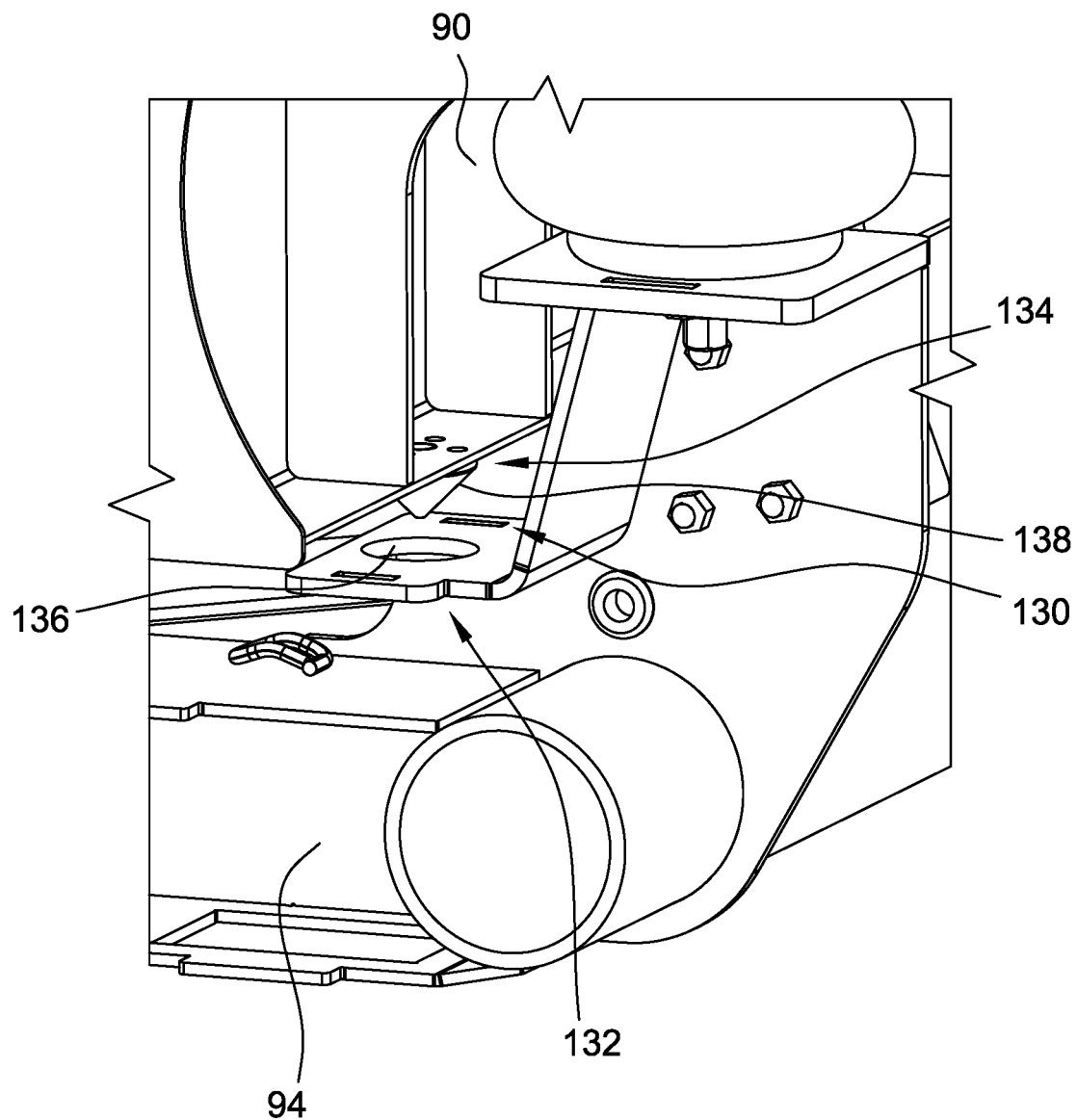
FIG. 6 is a detailed view of a positioning device of the shaker assembly in the raised position.
Figure 7:
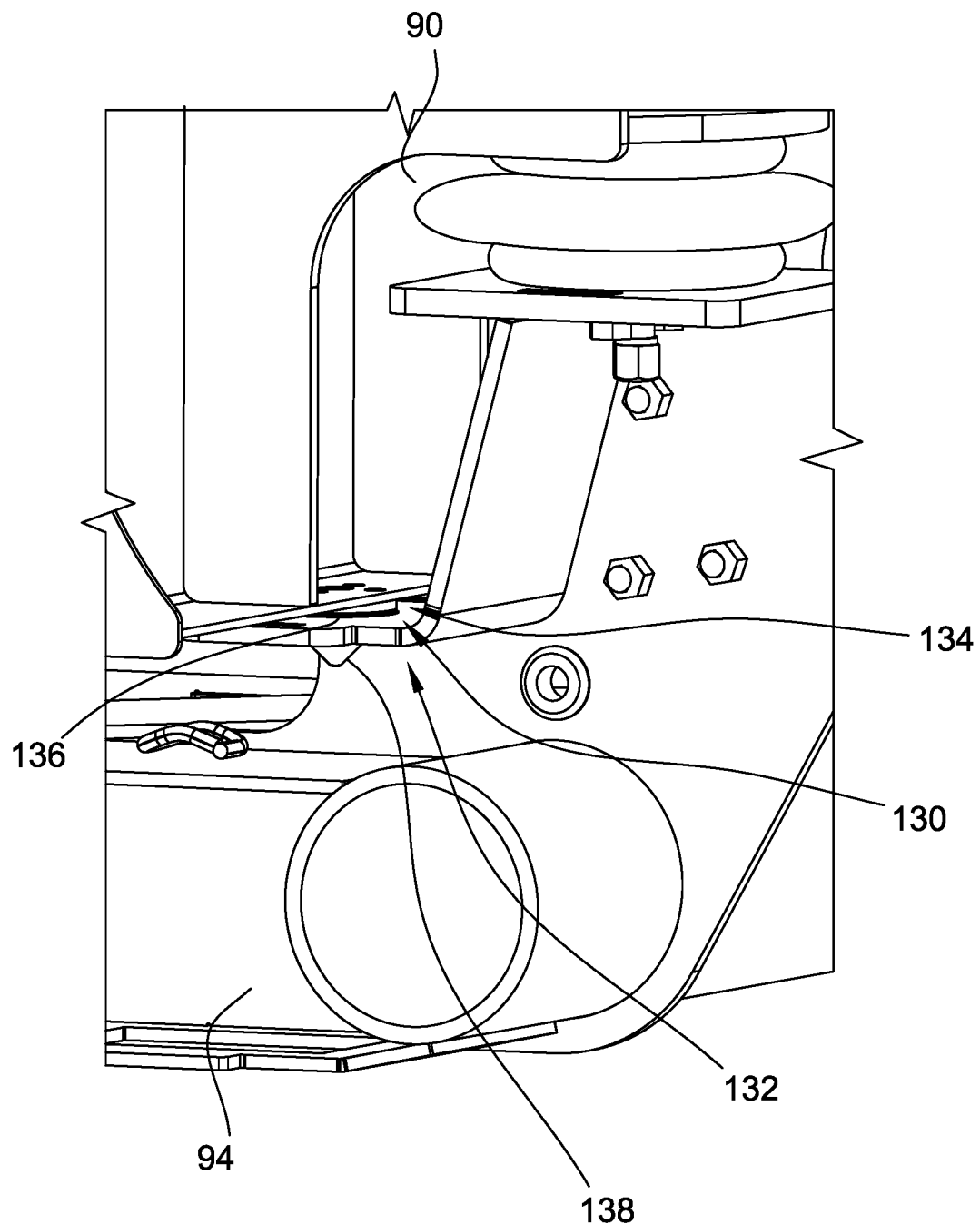
FIG. 7 is a detailed view of a positioning device of the shaker assembly in the lowered position.

In some embodiments, the vibratory frame 90 is guided as it is lowered from the raised position (FIG. 6) to the lowered position (FIG. 7) by a positioning device 130. The positioning device 130 may be used with or without the locking device 112 described above. For example, the positioning device 130 may constrain or limit movement of the vibratory frame 90 relative to the subframe 94 in a horizontal plane defined by axis A and axis B (FIG. 9) (e.g., in a fore and aft direction along axis A and/or side-to-side movement along axis B).

The positioning device 130 has a subframe guiding element 132 connected to the subframe 94 and a vibratory frame guiding element 134 connected to the vibratory frame 90. Each of the vibratory frame guiding elements 134 includes a conical alignment pin 138. Each of the subframe guiding elements 132 defines a receiving aperture 136 for releasably receiving the conical alignment pin 138 when the vibratory frame 90 is in the lowered position. In some embodiments, the subframe guiding elements 132 are conical alignment pins 138 and the vibratory frame guiding elements 134 define receiving apertures 136. As an alternative to conical alignment pins 138, straight-shaft pins or forked pins may be used. As an alternative to receiving apertures 136, mounting slots, channels, or extended fingers may be used to mount to the pin 138. In some embodiments, the positioning device 130 is an actuator system in the vertical plane that enables alignment. The subframe guiding elements 132 and vibratory frame guiding elements 134 may be parallel to a horizontal plane of the shaker assembly 88 as shown or may be angled with respect to the horizontal plane.

In embodiments in which the positioning device 130 is used in combination with locking device 12, the positioning device 130 aligns the vibratory frame 90 and the subframe 94 to allow the locking pin 126 of the actuator 118 to properly align with the subframe locking element 114 to enable the vibratory frame 90 to be secured to the subframe 94.

In the illustrated example, the positioning device 130 includes four vibratory frame guiding elements 134 and four corresponding subframe guiding elements 132. In other embodiments, the positioning device 130 may include any number of vibratory frame guiding elements 134 and subframe guiding elements 132 (e.g., a single vibratory frame guiding element 134 and a single subframe guiding element 132 or two, three or more than four vibrator frame guiding elements 134 and subframe guiding elements 132 may be used).

As the vibratory screen 92 (FIG. 1) vibrates, effluent falls through the openings within the vibratory screen 92 and into a catchpan 66 (FIG. 13). Particles that do not fit through the openings vibrate to the solids discharge end 64 of the shaker assembly 88. The shaker assembly 88 may include a pre-screen 104 (FIG. 4) that first engages material loaded onto the shaker assembly 88. In the illustrated embodiment, the pre-screen 104 has a plurality of slats 106 with openings formed between slats 106 through which material falls. In other embodiments, the openings of the pre-screen 104 have other shapes (circular, rectangular, and the like). The pre-screen 104 may have relatively large openings (e.g., at least about 0.5 inches, at least about 1 inch, at least about 1.5 inches, or 2 inches or more) such that relatively large material is prevented from passing through the pre-screen 104. The slats 106 have ribs 108 (FIG. 2) which reinforce the slats 106. The pre-screen 104 may be angled with respect to the vibratory screen 92 as shown or may be parallel to the screen 92.

The pre-screen 104 may be adapted to withstand the impact of large stones and earthen material. Example screens include screens that may be referred to by those of skill in the art as a "grizzly screener" or simply "grizzly." The pre-screen 104 may vibrate or, as in other embodiments, does not vibrate.

The openings of the vibratory screen 92 are of a smaller size than the openings of the pre-screen 104. In some embodiments, the size of the openings of the vibratory screen 92 are less than 250 micron, less than about 150 micron or less than about 100 micron. The ratio of the size of the openings of the pre-screen 104 to the size of the openings of the vibratory screen 92 may be at least about 100:1, at least about 250:1, or even at least about 500:1. In some embodiments, the vibratory screen 92 is divided into multiple segments that can separately be changed out for maintenance. The listed size of the openings and ratios thereof are exemplary and other ranges may be used unless stated otherwise.

Figure 9:
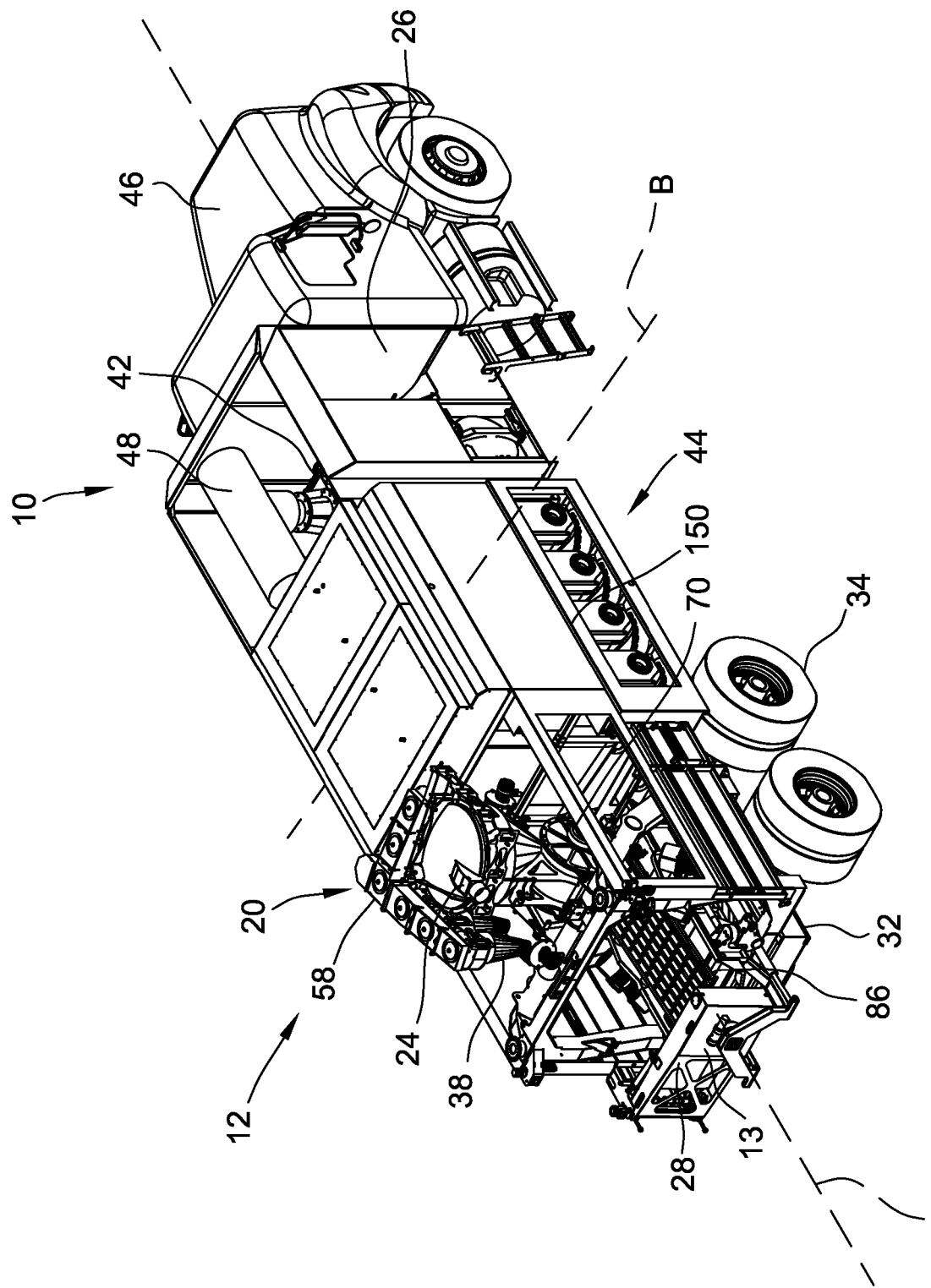
FIG. 9 is a perspective view of a vacuum truck including a hydro excavation vacuum apparatus with the conveyor in a transit position.

Referring now to FIG. 9, the shaker assembly 88 may be part of a hydro excavation vacuum apparatus 12 such as a hydro excavation vacuum apparatus 12 onboard a vacuum truck 10. Alternatively, the shaker assembly 88 may be a component of a drilling fluid processing system or "reclaimer" system such as the reclaimer system 160 shown in FIG. 15. In some embodiments, the shaker 88 is used to dewater dredge material or to size aggregate.

The hydro excavation vacuum apparatus 12 is used to excavate a site by use of a jet of high pressure water expelled through a wand. The cut earthen material and water are removed by a vacuum system and are processed onboard the hydro excavation vacuum apparatus by dewatering the slurry. Processed water may suitably be used for additional excavation or disposed. Recovered earthen material may be used to backfill the excavation site or disposed of.

The vacuum truck 10 described herein and shown in FIGS. 9-12 is an example vacuum truck. Generally any vacuum truck 10 that operates by hydro vacuum operation with on-board processing of cut earth and water may be used unless stated otherwise. Another example vacuum truck is disclosed in U.S. Provisional Patent Application No. 62/532,853, filed Jul. 14, 2017, entitled "Hydro Vacuum Excavation Apparatus," which is incorporated herein by reference for all relevant and consistent purposes. The vacuum truck 10 of the present disclosure may be operated as disclosed in U.S. Provisional Patent Application No. 62/532,853 and/or may include any of the processing units described therein.

A chassis 32 supports the various vacuum excavation components (e.g., vacuum system, separation vessel, airlock and/or dewatering system) with wheels 34 connected to the chassis 32 to transport the hydro excavation vacuum apparatus 12. The hydro excavation vacuum apparatus 12 may be self-propelled (e.g., with a dedicated motor that propels the hydro excavation vacuum apparatus), as in the present example, or may be adapted to be towed by a separate vehicle (e.g., may include a tongue and/or hitch coupler to connect to the separate vehicle).

The various components of the hydro excavation vacuum apparatus 12, such as the excavation pump, vacuum pump, shaker assembly, conveyor assembly for carrying away material exiting the hydro excavation vacuum apparatus, are powered by a motor 46. In the illustrated embodiment, the motor 46 also propels the hydro excavation vacuum apparatus 12. In other embodiments, the hydro excavation vacuum apparatus 12 includes a dedicated engine separate from the motor that propels the apparatus or the hydro excavation vacuum apparatus 12 is powered by other methods.

The hydro excavation vacuum apparatus 12 includes a front 26, rear 28, and a longitudinal axis A (FIGS. 9-11) that extends through the front 26 and rear 28 of the hydro excavation vacuum apparatus 12. The hydro excavation vacuum apparatus 12 includes a lateral axis B that is perpendicular to the longitudinal axis A.

The hydro excavation vacuum apparatus 12 includes a wand 14 (FIG. 12B) for directing pressurized water W toward earthen material to cut the earthen material. The wand 14 is connected to an excavation fluid pump 18 that supplies water to the wand 14. The excavation fluid pump 18 may supply a pressure of, for example, at least about 500 psi or at least about 1,000 psi (e.g., from about 1,000 psi to about 5,000 psi or from 1,000 psi to about 3,000 psi).

In some embodiments, the wand 14 includes a rotary nozzle 22 (FIG. 12B) for directing water W toward the earthen material to cut the earthen material. Generally, any rotary nozzle that causes the water to be directed toward the earthen material in a circular and random path at the site of the excavation may be used. In other embodiments, a straight tip nozzle that directs fluid along a straight path in a concentrated jet may be used.

The hydro excavation vacuum apparatus 12 includes a vacuum system 20 for removing spoil material from the excavation site. Spoil material or simply "spoils" may include, without limitation, rocks, cut earthen material (e.g., small particulate such as sand to larger pieces of earth that are cut loose by the jet of high pressure water), slurry, and water used for excavation. The spoil material may have a consistency similar to water, a slurry, or even solid earth or rocks. The terms used herein for materials that may be processed by the hydro excavation vacuum apparatus 12 such as, for example, "spoils," "spoil material," "cut earthen material" and "water", should not be considered in a limiting sense unless stated otherwise.

The vacuum system 20 includes a boom 24 that is capable of rotating toward the excavation site to remove material from the excavation site. The boom 24 may include a flexible portion 16 (FIG. 12A) and/or a solid portion that extends downward to the ground to vacuum spoil material from the excavation site. The flexible portion 16 may be manipulated manually by a user to direct the vacuum suction toward the excavation site. The boom 24 may be manipulated manually or powered, such as hydraulically or the like.

The vacuum system 20 acts to entrain the cut earth and the water used to excavate the site in a stream of air. A blower or vacuum pump 42 (FIG. 12A) pulls a vacuum through the boom 24 to entrain the material in the airstream. Air is discharged from the vacuum pump 42 after material is removed from the airstream. A filter 50 may be positioned upstream of the vacuum pump 42.

The airstream having water and cut earth entrained therein is pulled through the boom 24 and through a series of conduits and is pulled into a separation vessel 38. The separation vessel 38 removes at least a portion of cut earthen material and water from the airstream. Air exits the separation vessel 38 and is introduced into one or more cyclones 30 (FIG. 12A) to remove additional spoil material (e.g., water, small solids such as sand, low density particles such as sticks and grass, and the like) not separated in the separation vessel 38. Material that collects in the bottom of the cyclones 30 may be conveyed by an auger 56 to a cyclone discharge pump 36 (FIG. 11) (e.g., peristaltic pump). The air removed from the cyclones 30 is introduced into one or more filter elements 50 before entering the vacuum pump 42. The vacuum pump 42 generates vacuum in the system to pull water and cut earthen material into the hydro excavation vacuum apparatus 12 for processing. Air is removed from the hydro excavation vacuum apparatus through a vacuum exhaust 48.

The separation vessel 38 and cyclones 30 are part of a separation system 58 (FIG. 9) for removing spoil material from the airstream. The separation vessel 38 is a first stage separation in which the bulk of spoil material is removed from the airstream with carryover material in the airstream being removed by the cyclones 30 in a second stage and by the filter elements 50 in a third stage (i.e., the separation vessel 38 is the primary separation vessel with the downstream cyclones 30 being secondary separation vessels and the filter elements being a tertiary separation vessel).

Spoil material containing water and cut earth is introduced into the separation vessel 38. The separation vessel 38 may be a deceleration vessel in which the velocity of the airstream is reduced causing material to fall from the airstream toward a bottom of the separation vessel 38 (e.g., by gravity with reduced or no vortexing). In other embodiments, a separation vessel 38 using cyclonic separation (i.e., a cyclone) in which airflow travels in a helical pattern is used to remove material from the airstream. At least a portion of spoil material falls from the airstream into an airlock 70 (FIG. 13).

Figure 14:
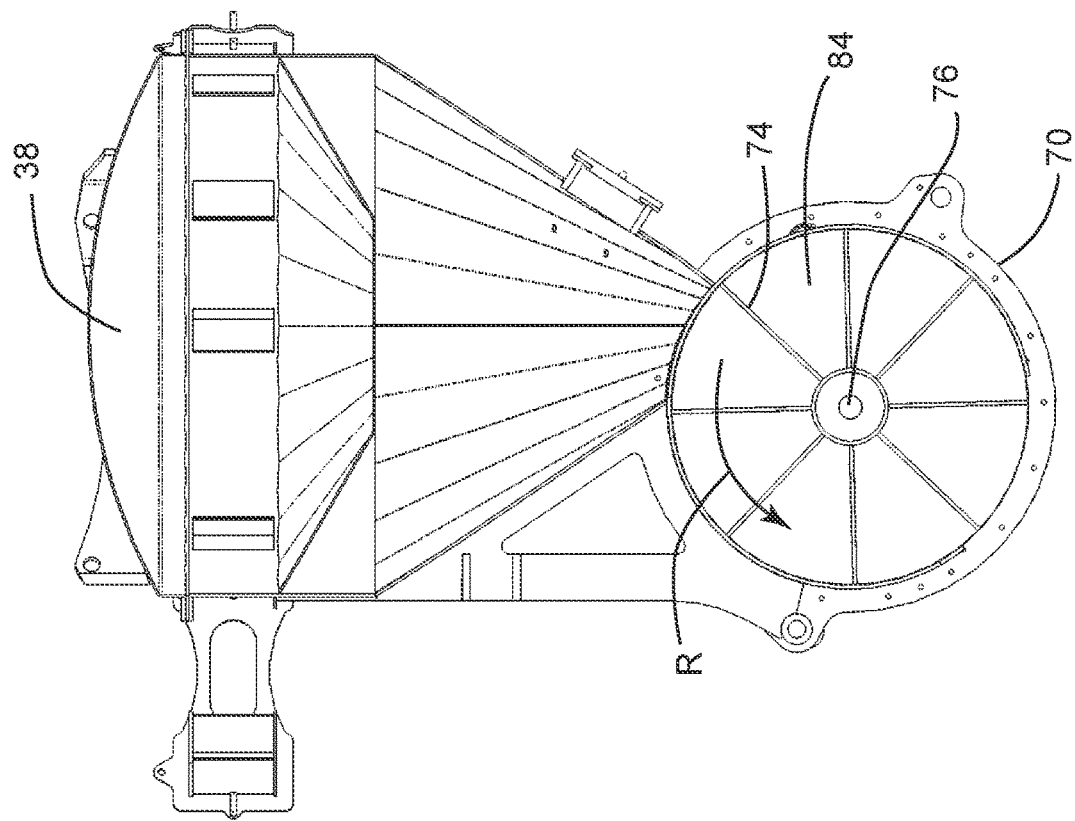
FIG. 14 is a cross section of an airlock of the hydro excavation vacuum apparatus.

Referring now to FIG. 14, the airlock 70 includes a plurality of rotatable vanes 74 connected to a shaft 76. The vanes 74 rotate along a conveyance path in the direction shown by arrow R in FIG. 14. The shaft 76 is connected to a motor 72 (FIG. 13) that rotates the shaft 76 and vanes 74 within a housing 78. Two adjacent vanes 74 collectively form a pocket 84 which receives spoil material. Material passes from the separation vessel 38 into the airlock 70 and water and cut earthen material are discharged from the airlock 70 and introduced into a dewatering system 86.

Figure 10:
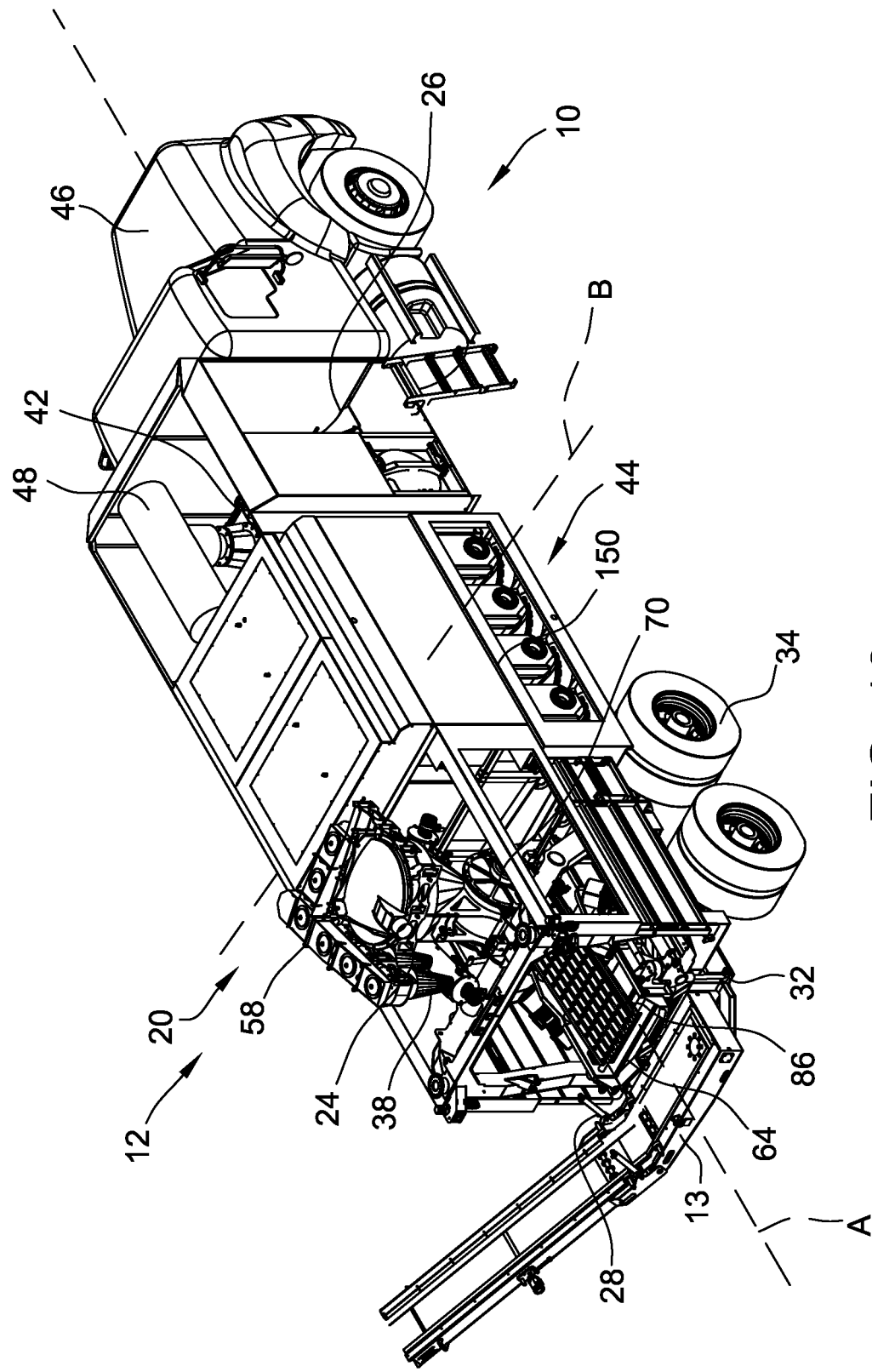
FIG. 10 is a perspective view of the vacuum truck and the hydro excavation vacuum apparatus having an extending conveyor.
Figure 11:
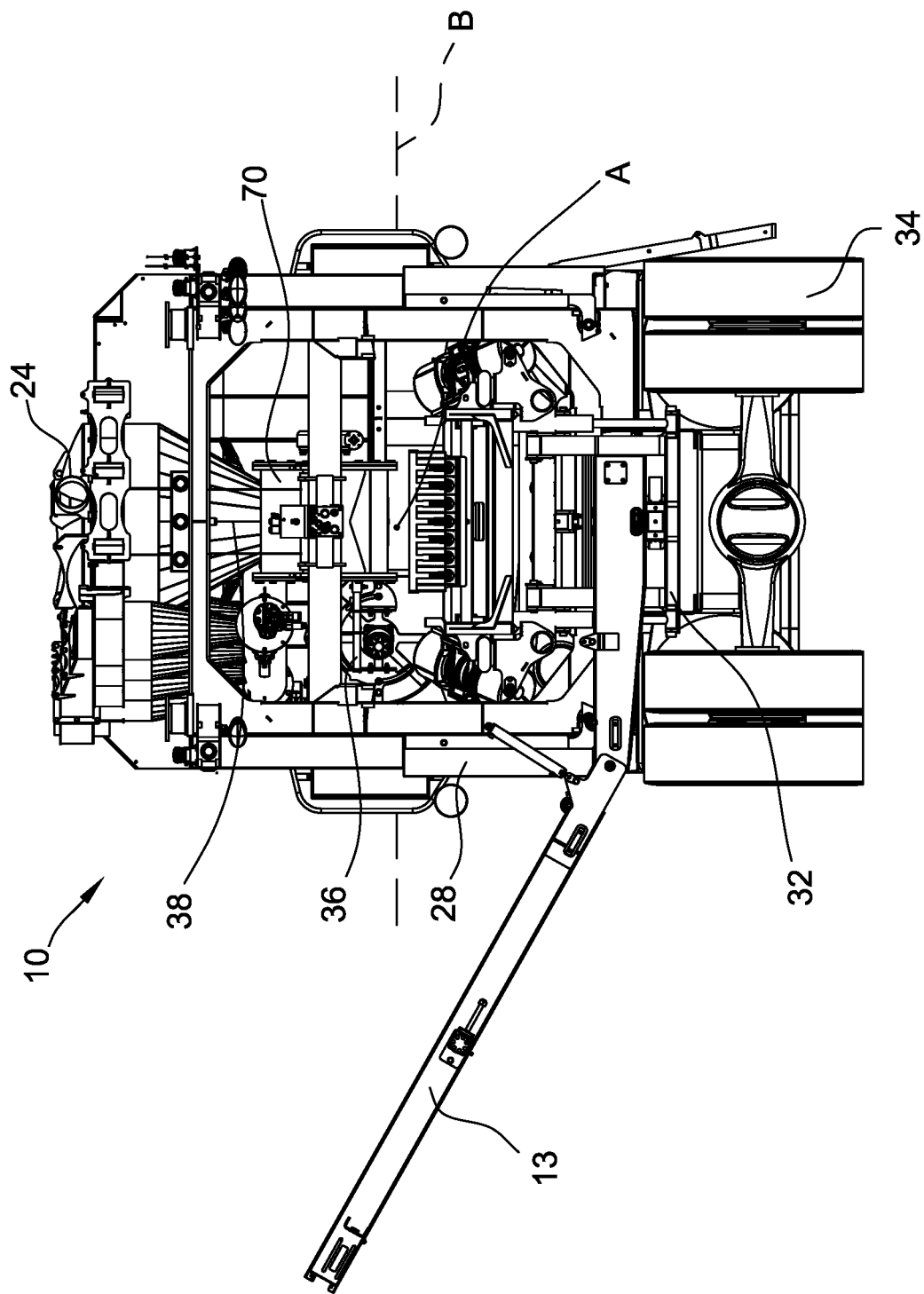
FIG. 11 is a rear view of the vacuum truck and the hydro excavation vacuum apparatus having an extended conveyor.
Figure 12:
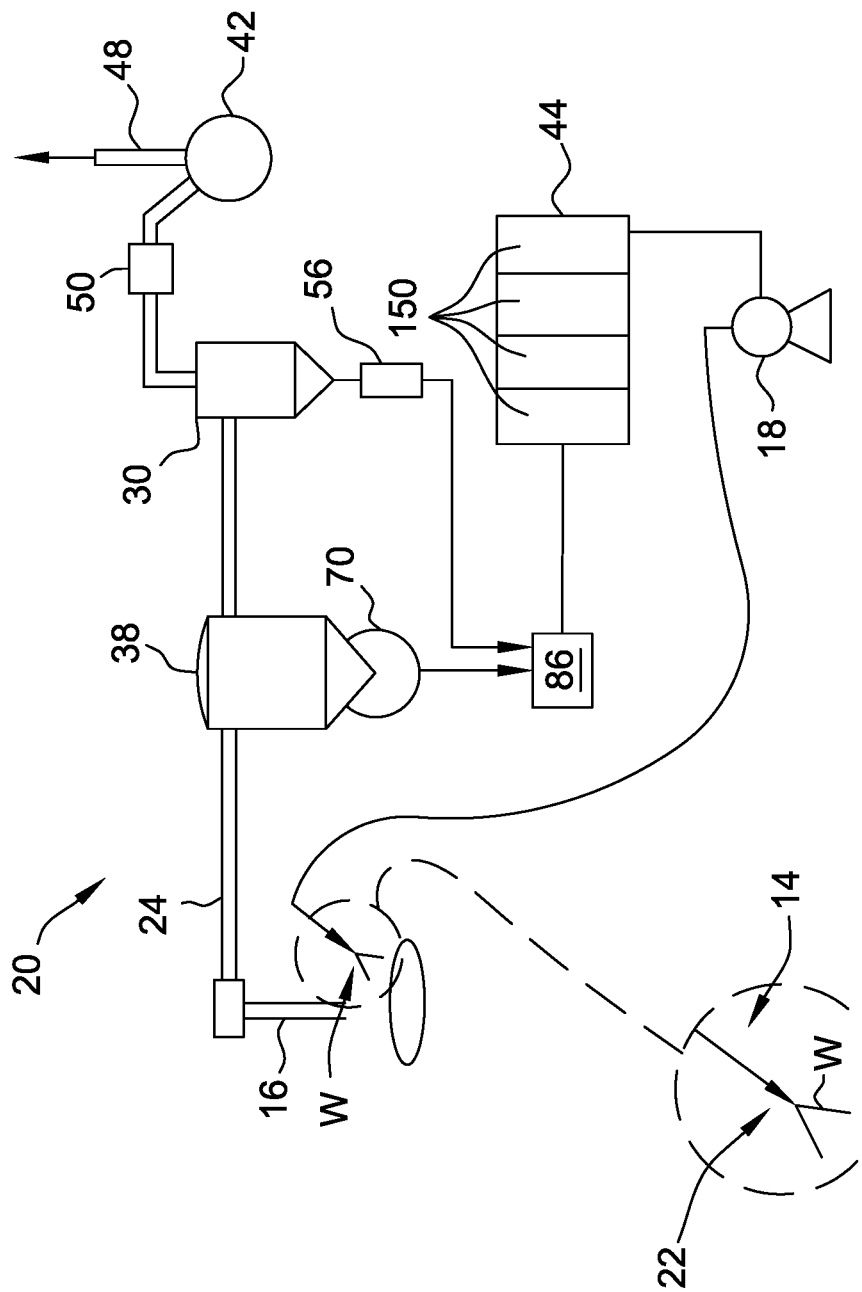
FIG. 12A is a schematic of water and air flow in the hydro excavation vacuum apparatus.
FIG. 12B is a schematic of the wand of the hydro excavation vacuum apparatus.

The dewatering system 86 includes the shaker assembly 88 and, optionally, additional dewatering units (e.g., flat-wire conveyor belts, cyclones (e.g., desander and/or desilter cyclones) and centrifuges such as the centrifuges disclosed in U.S. Pat. No. 7,523,570 which is incorporated herein for all relevant and consistent purposes). Solids that reach the solids discharge end 64 of the shaker assembly 88 fall onto the conveyor assembly 13 (FIGS. 9-11) and may be conveyed away from the hydro excavation vacuum apparatus 12 to form a stack of solids. Solids may be loaded into a bin, dumpster, loader bucket, ground pile, roll-off bin, dump truck or the like or may be conveyed to the site of the excavation as backfill. Solids may be transported off of the hydro excavation vacuum apparatus 12 by other methods. Liquid that passes through the vibratory screen 92 collects in a catchpan 66 (FIG. 13) and is conveyed to a fluid storage and supply system 44 (FIGS. 9-10).

The fluid storage and supply system 44 (FIGS. 9-10) supplies water for high pressure excavation and stores water recovered from the dewatering system 86. The fluid storage and supply system 44 may include a plurality of vessels 150 for holding fluid.

Figure 15:
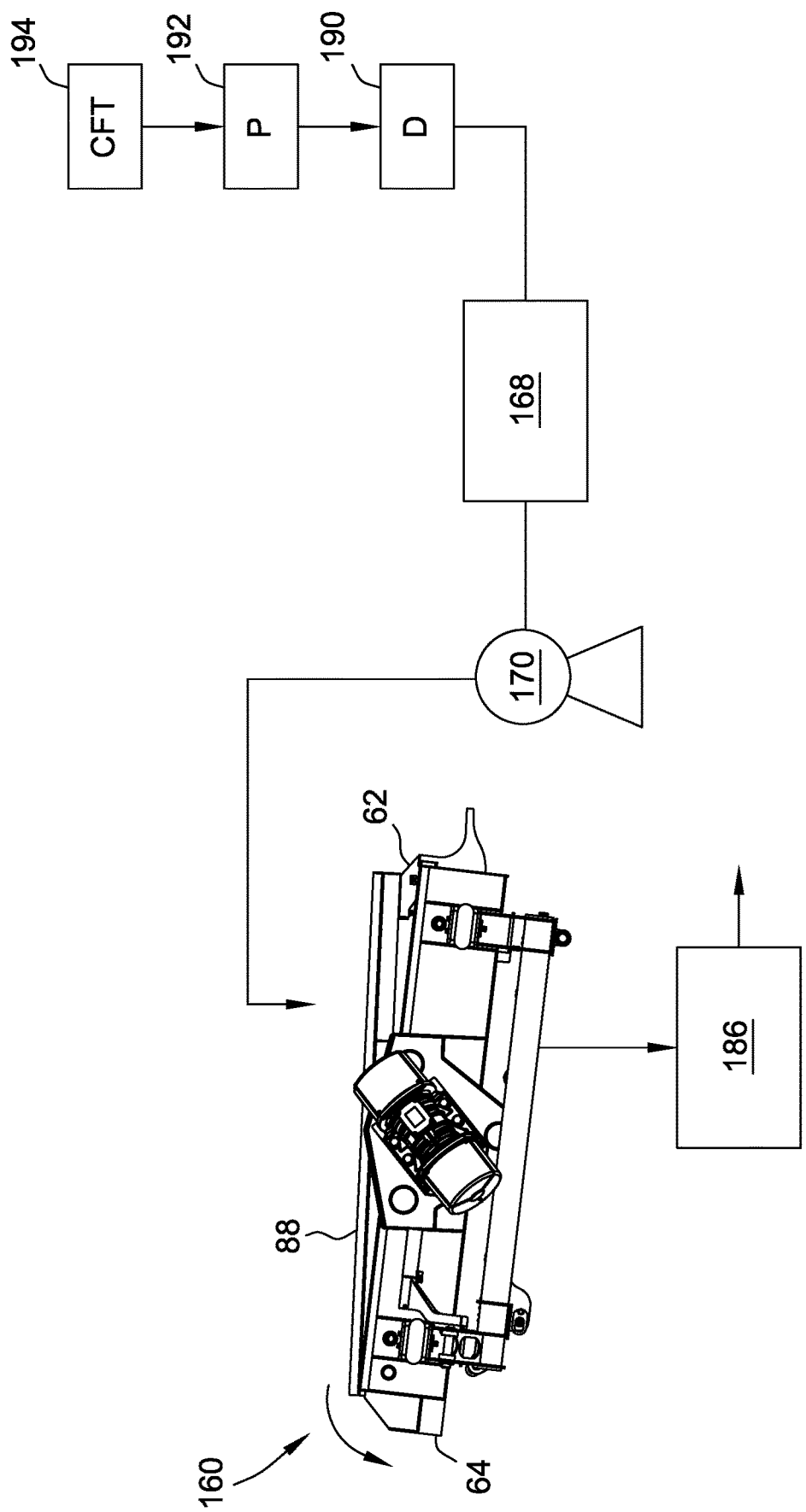
FIG. 15 is a schematic of a drilling fluid reclaimer system.

In some embodiments, the shaker assembly 88 is a component of a drilling fluid processing system or "reclaimer" system such as the reclaimer system 160 shown in FIG. 15. Such reclaimer systems are configured to remove at least some of the solid particulate/cuttings generated during drilling from used drilling fluid.

Generally, any source of drilling fluid may be processed in the reclaimer system 160. In the illustrated embodiment, the drilling fluid is received from a drilling system 190. One or more pumps 192 feeds clean drilling fluid from a clean drilling fluid vessel 194 into the drilling system 190. Drilling fluid from the drilling system 190 is fed to a spent drilling fluid storage vessel 168 and is pumped to the shaker assembly 88. In other embodiments, the spent drilling fluid storage vessel 168 and/or pump 170 is eliminated and drilling fluid is sent directly to the shaker assembly 88.

The shaker assembly 88 catches solids in the used drilling fluid while allowing drilling fluid to pass through the shaker assembly 88. In the illustrated embodiment, the shaker assembly is sloped upward from the loading end 62 to the solids discharge end 64. In other embodiments, the shaker assembly 88 is sloped downward from the loading end 62 to the solids discharge end 64. Liquid that passes through the shaker assembly 88 is collected and, optionally, may be introduced into a downstream processing system 186 (e.g., one or more cyclones).

The reclaimer system 160 may include additional processing units that may operate in parallel or in series (e.g., two, three or four or more shaker assemblies 88). Embodiments of the reclaimer system 160 may include other processing units that pre-process or post-process the used drilling fluids including, for example, settling tanks, hydroclones (e.g., desander cyclones and/or desilter cyclones), additive storage, mixers and centrifuges such as the centrifuges disclosed in U.S. Pat. No. 7,523,570).

Compared to conventional shaker assemblies, the shaker assemblies described herein have several advantages. Use of an apparatus to automatically secure the vibratory frame relative to the subframe for transportation of the hydro excavation vacuum apparatus reduces the time required to transport/setup the hydro excavation vacuum apparatus. When the vibratory frame is lowered for transportation, a positioning device guides the vibratory frame to the subframe. The positioning device may constrain movement of the vibratory frame relative to the subframe in the horizontal plane when the vibratory frame is the lowered position. When combined with a locking device, the positioning device may align a locking device such as a locking device having a subframe locking element and a vibratory frame locking element. This arrangement allows the vibratory frame to be automatically locked to the subframe after being lowered which reduces the time required to prepare the hydro excavation vacuum apparatus for transit. In some embodiments, the locking device includes an actuator including an extendable locking pin that extends into a locking element when the isolation device is deflated and the vibratory frame is in the lowered position and that retracts when the isolation device inflates.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A shaker assembly for dewatering material, the shaker assembly comprising:
   a vibratory frame;
   a subframe that supports the vibratory frame;
   an isolation device for isolating vibration of the vibratory frame from the subframe, the isolation device being connected to the vibratory frame and the subframe, the isolation device initiating movement of the vibratory frame between a raised position in which a vibratory screen operates to dewater material and a lowered position in which the vibratory frame sits on the subframe; and a subframe guiding element connected to the subframe and a vibratory frame guiding element connected to the vibratory frame, the subframe guiding element being spaced from the vibratory frame guiding element, when the vibratory frame is in the raised position, the subframe guiding element further being positioned to contact the vibratory frame guiding element, when the vibratory frame is in the lowered position, to constrain movement of the vibratory frame relative to the subframe.

2. The shaker assembly as set forth in claim 1 further comprising a locking device for securing the vibratory frame to the subframe when the vibratory frame is in the lowered position, the locking device having a subframe locking element connected to the subframe and a vibratory frame locking element connected to the vibratory frame.

3. The shaker assembly as set forth in claim 2 wherein one of the subframe locking element and the vibratory frame locking element is an extendable locking pin for securing the vibratory frame to the subframe in the lowered position, the extendable locking pin being in an unlocked position when the vibratory frame is in the raised position and being in a locked position when the vibratory frame is in the lowered position.

4. The shaker assembly as set forth in claim 3 wherein one of the subframe locking element and the vibratory frame locking element defines a locking pin opening for releasably receiving the locking pin.

5. The shaker assembly as set forth claim 3 further comprising a powered actuator that retracts and extends the locking pin.

6. The shaker assembly as set forth in claim 1 wherein one of the subframe guiding element and the vibratory frame guiding element comprises a conical alignment pin and the other of the subframe guiding element and the vibratory frame guiding element comprises a receiving aperture for releasably receiving the conical alignment pin.

7. The shaker assembly as set forth in claim 1 wherein the isolation device drives movement of the vibratory frame from the lowered position to the raised position.

8. The shaker assembly as set forth in claim 1 further comprising a motor connected to the vibratory frame and operable to move the vibratory screen to dewater material, when the vibratory frame is in the raised position.

9. A shaker assembly for dewatering material, the shaker assembly comprising:

a vibratory frame that supports a vibratory screen having openings for dewatering material that contacts the screen;

a subframe that supports the vibratory frame, wherein the vibratory frame is moveable between a raised position and a lowered position in which the vibratory frame is secured to the subframe;

a motor connected to the vibratory frame and operable to move the vibratory screen to dewater material, when the vibratory frame is in the raised position;

an isolation device for isolating vibration of the vibratory frame from the subframe, the isolation device extending between the vibratory frame and the subframe; and a locking device mounted to the subframe and moveable between a locked position, when the vibratory frame is in the lowered position, in which the locking device engages the vibratory frame and secures the vibratory frame to the subframe and an unlocked position in which the locking device is disengaged from the vibratory frame allowing the vibratory frame to move relative to the subframe, the locking device being powered to extend and retract to move between the locked and unlocked positions.

10. The shaker assembly as set forth in claim 9 wherein the vibratory frame is moveable between a raised position in which the vibratory screen operates to dewater material and a lowered position in which the vibratory frame is secured to the subframe, the locking device moving to the locked position when the vibratory frame is in the lowered position.

11. The shaker assembly as set forth in claim 10 comprising a positioning device that guides the vibratory frame as the vibratory frame lowers from the raised position to the lowered position, the positioning device aligning the locking device with a subframe locking element to enable the vibratory frame to be secured to the subframe.

12. The shaker assembly as set forth in claim 11 wherein the positioning device comprises a conical alignment pin and a mount opening, the alignment pin being received in the mount opening when the vibratory frame is in the lowered position.

13. The shaker assembly as set forth in claim 9 wherein the locking device is a powered cylinder.

14. The shaker assembly as set forth in claim 13 wherein the powered cylinder comprises:

a barrel; and a locking pin that extends from the barrel, the locking device being configured to retract the locking pin into the barrel when the locking device is powered and to extend the pin from the barrel when the locking device is not powered.

15. The shaker assembly as set forth in claim 9 wherein the isolation device is an inflatable airbag.

16. The shaker assembly as set forth in claim 9, wherein, when the locking device is in the locked position, the locking device limits movement of the of the vibratory frame on the isolation device.

* * * * *